(12) United States Patent
Koskinen et al.

(10) Patent No.: US 8,061,937 B2
(45) Date of Patent: Nov. 22, 2011

(54) CUTTING TOOL AND INSERT FOR CUTTING TOOL

(75) Inventors: Jorma Koskinen, Fagersta (SE); Lars-Martin Hessleryd, Köping (SE)

(73) Assignee: Seco Tools AB, Fagersta (SE)

( * ) Notice: Subject to any disclaimer, the term of this patent is extended or adjusted under 35 U.S.C. 154(b) by 598 days.

(21) Appl. No.: 12/268,124

(22) Filed: Nov. 10, 2008

(65) Prior Publication Data

US 2009/0169314 A1  Jul. 2, 2009

(30) Foreign Application Priority Data

Nov. 14, 2007  (SE) .......................... 0702497

(51) Int. Cl.
*B23B 1/00* (2006.01)
*B23B 3/00* (2006.01)

(52) U.S. Cl. .............. 407/66; 407/67; 407/113

(58) Field of Classification Search .............. 407/66, 407/67, 35, 41, 87, 94, 97, 103
See application file for complete search history.

(56) References Cited

U.S. PATENT DOCUMENTS

| 3,339,257 | A | * | 9/1967 | Hargreaves et al. | 407/38 |
| 3,905,081 | A | * | 9/1975 | Wirfelt | 407/103 |
| 4,050,127 | A |   | 9/1977 | Bodem | |
| 4,993,889 | A |   | 2/1991 | Kelm | |
| 5,217,330 | A | * | 6/1993 | Dennstedt | 407/37 |
| 6,056,484 | A | * | 5/2000 | Mitchell et al. | 407/36 |
| 6,155,753 | A | * | 12/2000 | Chang | 407/92 |
| 7,534,075 | B2 | * | 5/2009 | Kress et al. | 407/66 |
| 7,802,945 | B2 | * | 9/2010 | Sheffler et al. | 407/67 |

FOREIGN PATENT DOCUMENTS

EP  1314502 A1  5/2003

* cited by examiner

*Primary Examiner* — Will Fridie, Jr.
(74) *Attorney, Agent, or Firm* — WRB-IP LLP

(57) ABSTRACT

A cutting tool includes a cutting insert and a toolholder including at least one insert supporting surface. A first clamp is adapted to apply a clamping force in a first direction to clamp the insert to the insert supporting surface, and a second clamp is adapted to limit rotation of the insert about an axis extending substantially in the first direction. The toolholder includes a second insert supporting surface. The second clamp applies a clamping force to the insert in a second direction to clamp the insert to the second insert supporting surface, and the second insert supporting surface is disposed on an opposite side of the insert from the second clamp.

17 Claims, 5 Drawing Sheets

CUTTING TOOL AND INSERT FOR CUTTING TOOL

The present invention relates to a cutting tool with replaceable inserts and, more particularly, to a cutting tool with plural clamps for clamping a replaceable insert relative to the cutting tool.

It is typical to secure a cutting insert to a toolholder using a screw having a frustoconical head. The screw extends through a hole in the insert and is screwed into, e.g., the body of the toolholder. The frustoconical head of the screw abuts a counterpart frustoconical surface of the hole in the insert so that, as the screw is screwed into the body of the toolholder, a force is applied to the insert from the screw in the direction of the screw to clamp a bottom surface of the insert against a surface of the toolholder that is generally perpendicular to the direction of the screw. Application of this force results in a tensile stress on the screw.

Typically, the hole in the body of the toolholder into which the screw is screwed is configured relative to a recess in the toolholder for the insert so that the force of the screw on the insert has a component that extends laterally to the direction of the screw and urges the insert to move against walls of the recess that are generally parallel to the direction of the screw to more securely support the insert. This force results in a shear stress on the screw. Large forces are applied to the screw in such clamping arrangements and screw breakage is not uncommon.

It is desirable to provide a cutting tool with a clamping arrangement and insert wherein the insert can be securely and accurately clamped relative to a toolholder with reduced risk of breakage of the clamping arrangement due to shear forces.

According to an aspect of the present invention, a cutting tool comprises a cutting insert, a toolholder comprising at least one insert supporting surface, a first clamp adapted to apply a clamping force in a first direction to clamp the insert to the insert supporting surface, and a second clamp adapted to limit rotation of the insert about an axis extending substantially in the first direction, wherein the toolholder comprises a second insert supporting surface, the second clamp applying a clamping force to the insert in a second direction to clamp the insert to the second insert supporting surface, the second insert supporting surface being disposed on an opposite side of the insert from the second clamp.

According to another aspect of the present invention, a cutting insert comprises an insert body comprising a bottom surface, a top surface, and a plurality of edge surfaces between the bottom surface and the top surface, a first clamping surface arranged to receive a clamping force in a direction from the top surface to the bottom surface, and a second clamping surface on a first edge surface; and an abutment surface on a second edge surface on an opposite side of the insert from the second clamping surface arranged to receive an opposing force when a second clamping force is applied to the second clamping surface.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
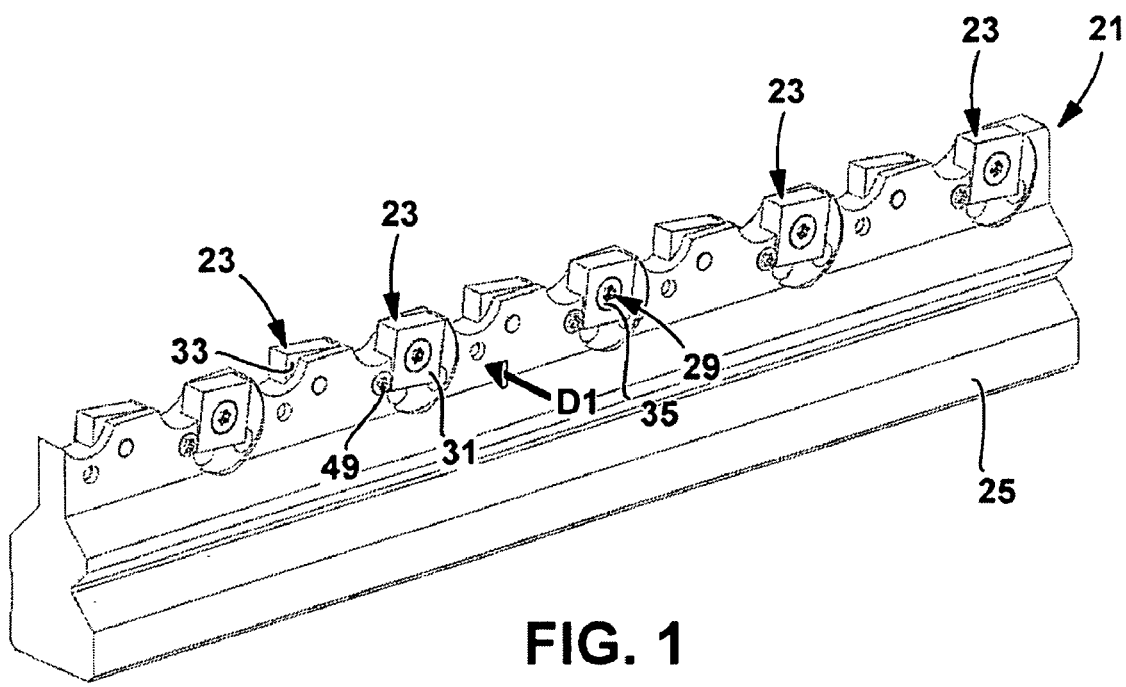
FIG. 1 is a top perspective view of a cutting tool according to an embodiment of the present invention.
Figure 2:
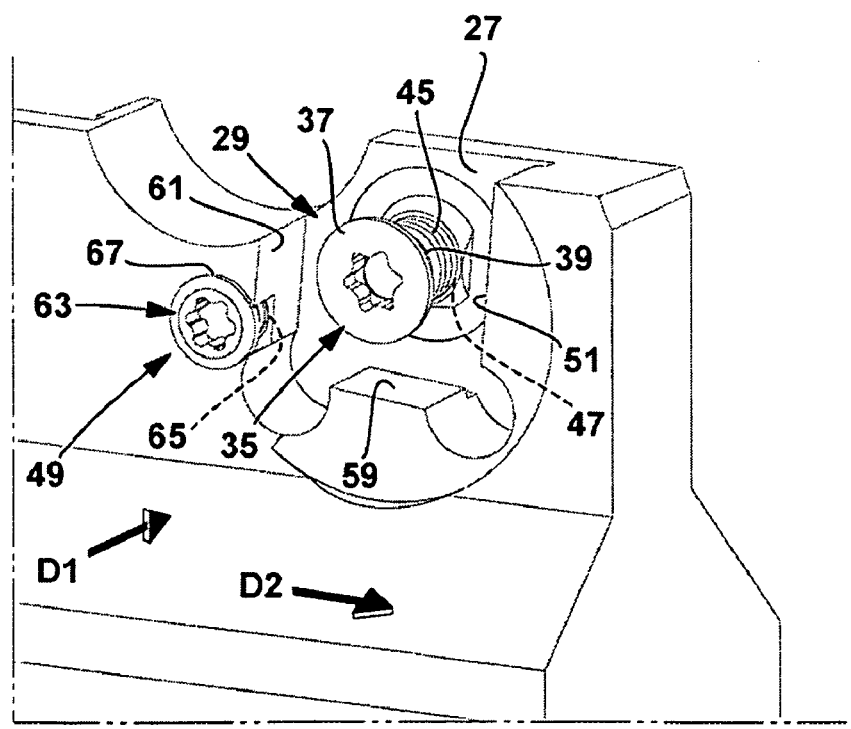
FIG. 2 is a top perspective view of a portion of the cutting tool of FIG. 1 showing a cutting insert removed from the cutting tool.

A cutting tool 21 according to an embodiment of the present invention is shown in FIG. 1. The cutting tool 21 includes a cutting insert 23 and, often, as shown, includes a plurality of such inserts. The cutting tool 21 also includes a toolholder 25 comprising at least one insert supporting surface 27, as seen in FIG. 2. The cutting tool 21 shown in FIGS. 1-3 is a broaching tool, however, it will be appreciated that the present invention has applicability to a wide range of cutting tools with replaceable cutting inserts, such as turning tools and rotating tools, such as milling, drilling, and boring tools.

As seen in FIG. 1, the cutting tool 21 also includes a first clamp 29 adapted to apply a clamping force in a first direction D1 to clamp the insert 23 to the insert supporting surface 27. The first clamp 29 can be in any suitable form, such as a cantilever-type clamp that abuts a top surface 31 of the insert 23 to force the bottom surface 33 against the insert supporting surface 27. A presently preferred form for the first clamp 29 comprises a screw 35 having a head 37 with a generally frustoconical external surface 39 as seen in FIG. 2. As seen in FIG. 3, a hole 41 is provided in the insert 23 with a generally frustoconical internal surface 43 against which the frustoconical external surface 39 of the screw 35 is adapted to abut when threads 45 of the screw are fully received in an internally threaded hole 47 (hidden by screw in FIG. 2) in the toolholder 25. Force applied by the frustoconical external surface 43 of the head 37 of the screw 35 on the frustoconical internal surface 43 of the hole 41 in the insert 23 urges the bottom surface 33 against the insert supporting surface 27.

A second clamp 49 is provided and is adapted to limit rotation of the insert 23 about an axis extending substantially in the first direction D1. Ordinarily, the toolholder 25 comprises a second insert supporting surface 51, and the second clamp 49 applies a clamping force in a second direction D2 to clamp the insert 23 to the second insert supporting surface. By providing the second clamp 49, the need for using the first clamp 29 to clamp the insert 23 against the first insert supporting surface 27 and the second insert supporting surface 51 is reduced, and shear strain in the first clamp can be reduced. In addition, clamping forces that, in the past, were borne by a single clamp can be borne by two clamps.

Figure 3:
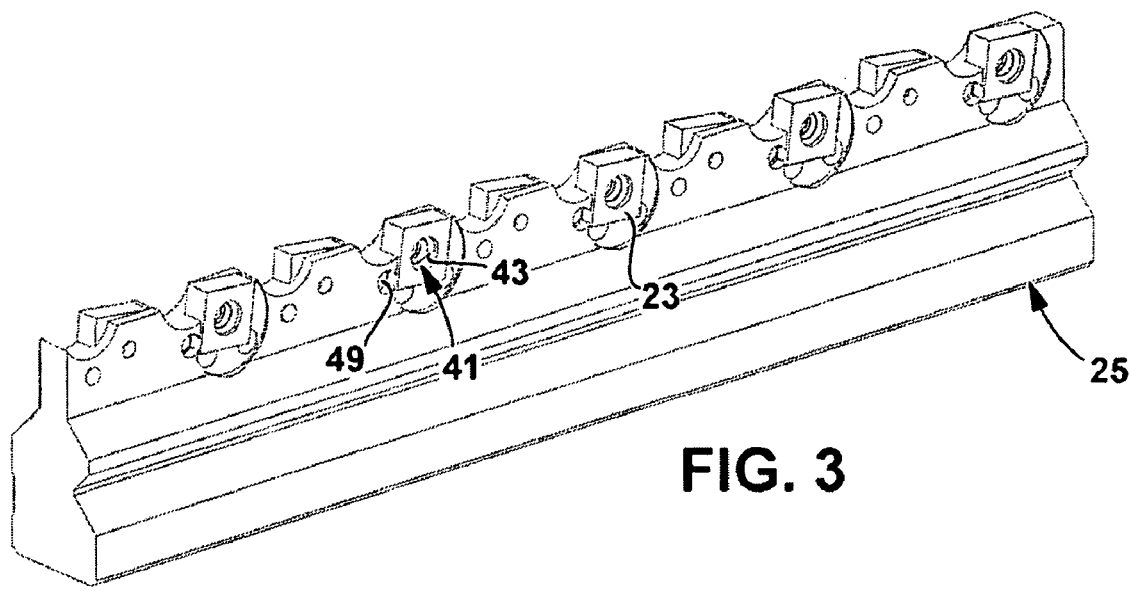
FIG. 3 is a top perspective view of a cutting tool of FIG. 1 showing a first clamp removed from a cutting insert.
Figure 4:
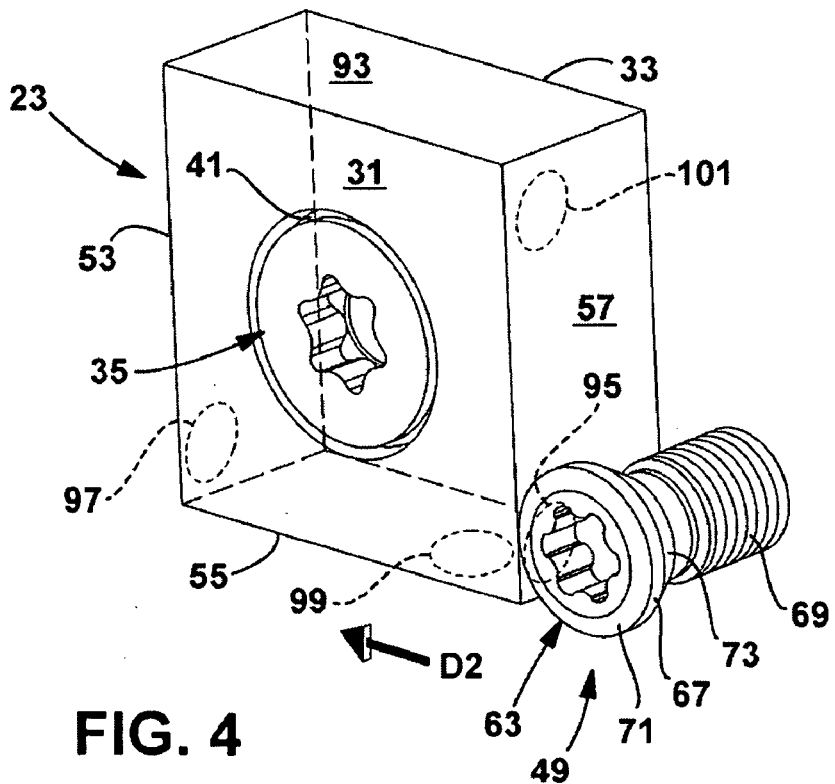
FIG. 4 is a top perspective view of a cutting insert and first and second clamps according to an embodiment of the present invention.

In the embodiment shown in FIGS. 1-3, the application of the force in the direction D2 can urge edges 53, 55, and 57 (FIG. 4) of the insert 23 against three insert supporting surfaces 51, 59, and 61 (FIG. 2) of the toolholder 25. FIG. 4 shows the second clamp 49 on a different side of the insert 23 than the embodiments shown in FIGS. 1-3 and merely demonstrates that the invention can comprise a variety of configurations.

The embodiment of the second clamp 49 shown in FIGS. 1-3 comprises a screw 63 that is screwed into an internally threaded hole 65 (hidden by screw in FIG. 2) in the tool holder 25. The internally threaded hole 65 extends substantially in the first direction D1. The second clamp 49 comprises an insert abutting surface portion 67 and an externally threaded portion 69, as seen in FIG. 4. The insert abutting surface portion 67 is ordinarily circularly cylindrical. It is anticipated that there will generally be substantially line contact over a height of the insert abutting surface portion 67 and the insert edge 57. The head 71 of the screw 63 can comprise a sloped or generally frustoconical external surface 73 below the insert abutting surface portion 67 to assist the screw to be screwed into the internally threaded hole 65 when the insert 23 is mounted to the toolholder 25 by the first clamp 29.

In the embodiments shown in FIGS. 1-4, the holes 47 and 65 into which the screws 35 and 63 are screwed extend generally in the same direction D1. In the embodiments shown in FIGS. 5-9, the screws forming parts of the first and second clamps extend in different directions.

Figure 5:
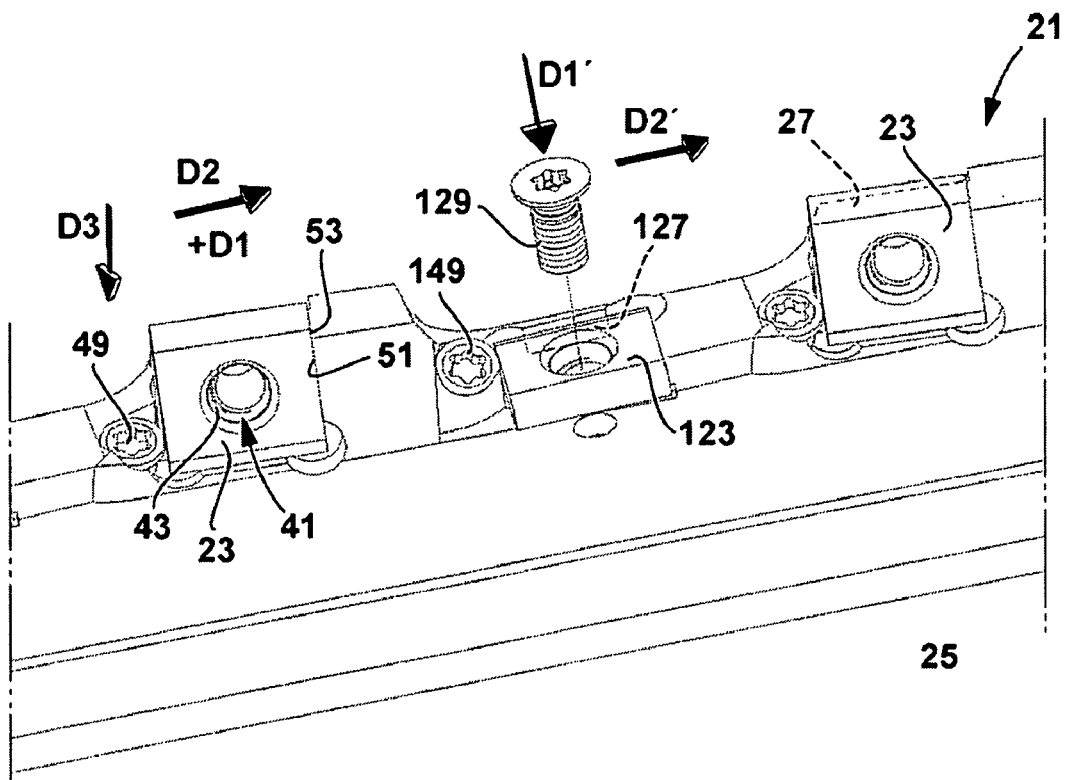
FIG. 5 is a top perspective view of a cutting tool according to another embodiment of the present invention.

In the embodiment of the tool 121 shown in FIG. 5, which may be used as a disc milling tool, the internally threaded hole for the screw 135 forming part of the first clamp extends in a first direction D1 (directional arrow shown as "+" to represent arrow extending substantially straight into the picture in FIG. 5), while the internally threaded hole for the screw 63 extends in a direction D3 that is non-parallel with the first direction (although the direction D2 in which the clamp 49 applies a force is different than the direction D3). The angle defined by directions D1 and D3 in FIG. 5 may be any suitable angle, ordinarily 90° or less, and some inserts 23 may be clamped to insert supporting surfaces 27 (shown in phantom beneath the inserts 23) on the toolholder that are at different orientations to the cutting tool 25 than insert supporting surfaces 127 (partially shown in phantom beneath the inserts 123) for other inserts 123, and holes for clamps 129 and 149 in the toolholder 125 may extend in directions other than the directions D1 and D3 and may exert forces D1' and D2' on the inserts in directions other than D1 and D2. The configurations of the first and second clamps 29 and 49 and 129 and 149 can otherwise be the same as in the embodiments shown in FIGS. 1-4.

Figure 6:
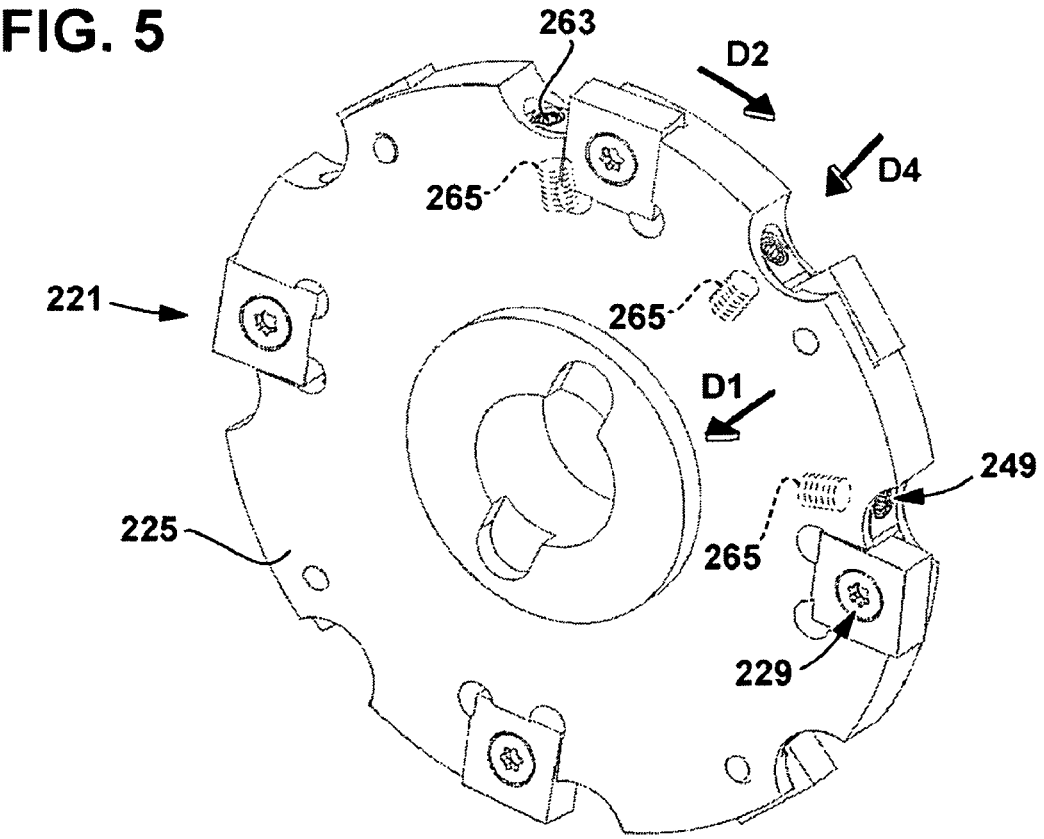
FIG. 6 is a top perspective view of a cutting tool according to yet another embodiment of the present invention.
Figure 7:
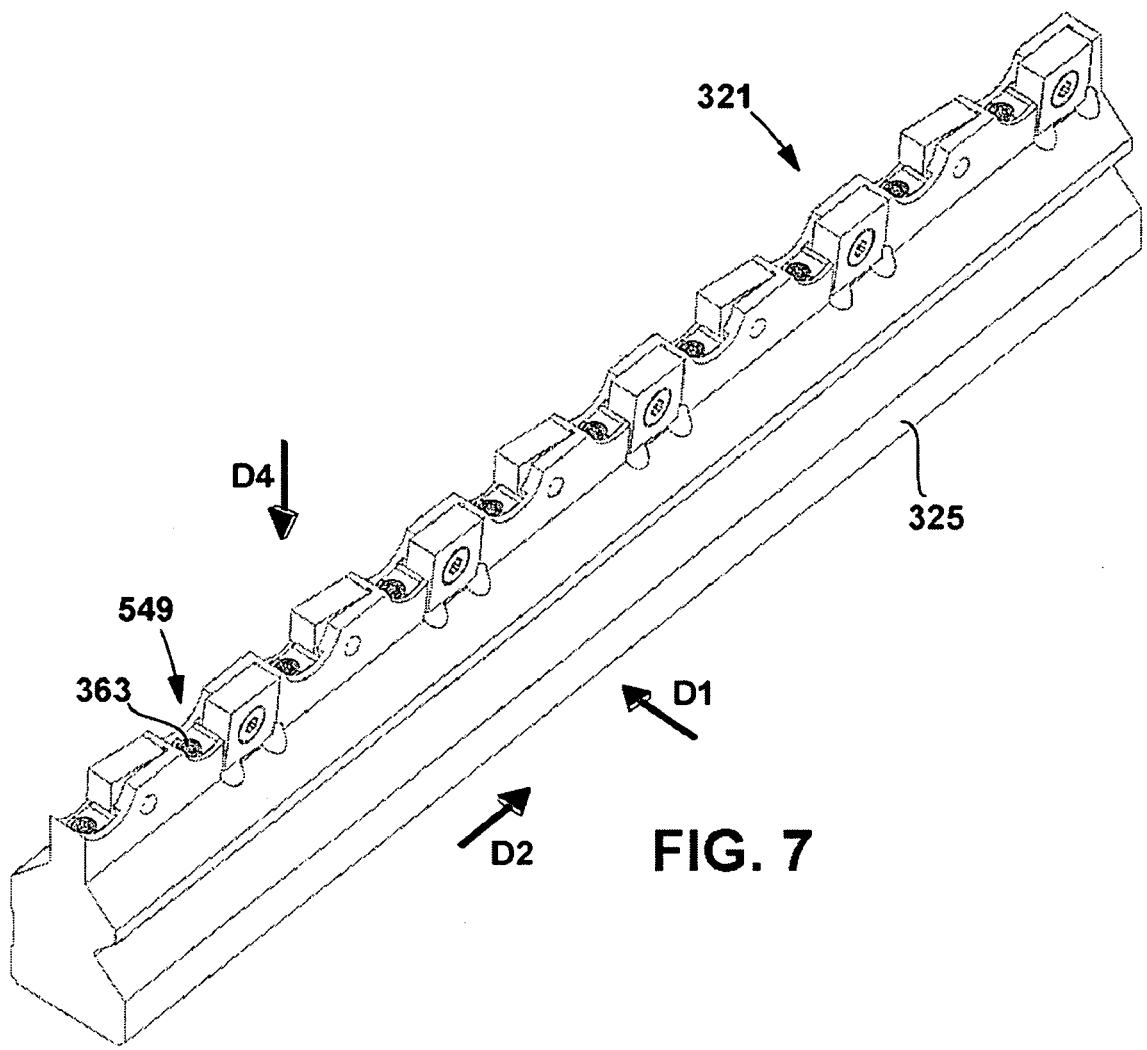
FIG. 7 is a top perspective view of a cutting tool according to still another embodiment of the present invention.
Figure 8:
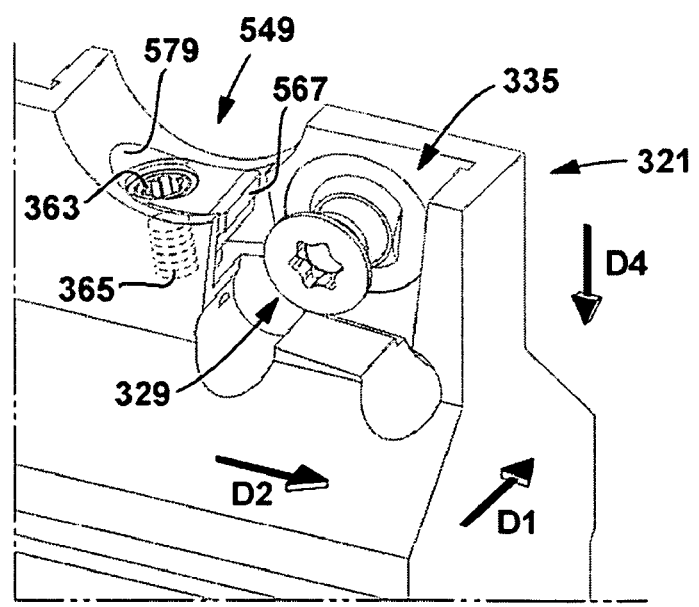
FIG. 8 is a top perspective view of the cutting tool of FIG. 7 showing the inserts removed from the toolholder.

FIGS. 6-8 show embodiments 221 and 321 of cutting tools in which internally threaded holes 265 and 365 (both shown in phantom) for receiving screws 263 and 363 of second clamps 249 and 349 extend in directions D4 substantially perpendicular to the first direction D1 in which force is applied by the first clamps 229 and 329 and in which screws 235 and 335 of the first clamps and holes for receiving those screws extend. The clamps 249 and 349 are arranged so that they apply a force in a direction D2. In the embodiment shown in FIG. 6, the holes 265 formed in the toolholder 325 extend at different angles to the toolholder 225 as axes of the holes all extend generally in the direction of the centerpoint of the circular tool. References to the directions D2 and D4 are understood to be peculiar to each one of the illustrated inserts. By contrast, in the embodiments shown in FIGS. 1-3 and 7-8, the holes 65 and 365 in each embodiment extend generally in the same direction D4 as all other holes in the particular embodiment, and the clamps 49 and 349 apply forces in generally the same direction D2 as for all of the other clamps.

Figure 9:
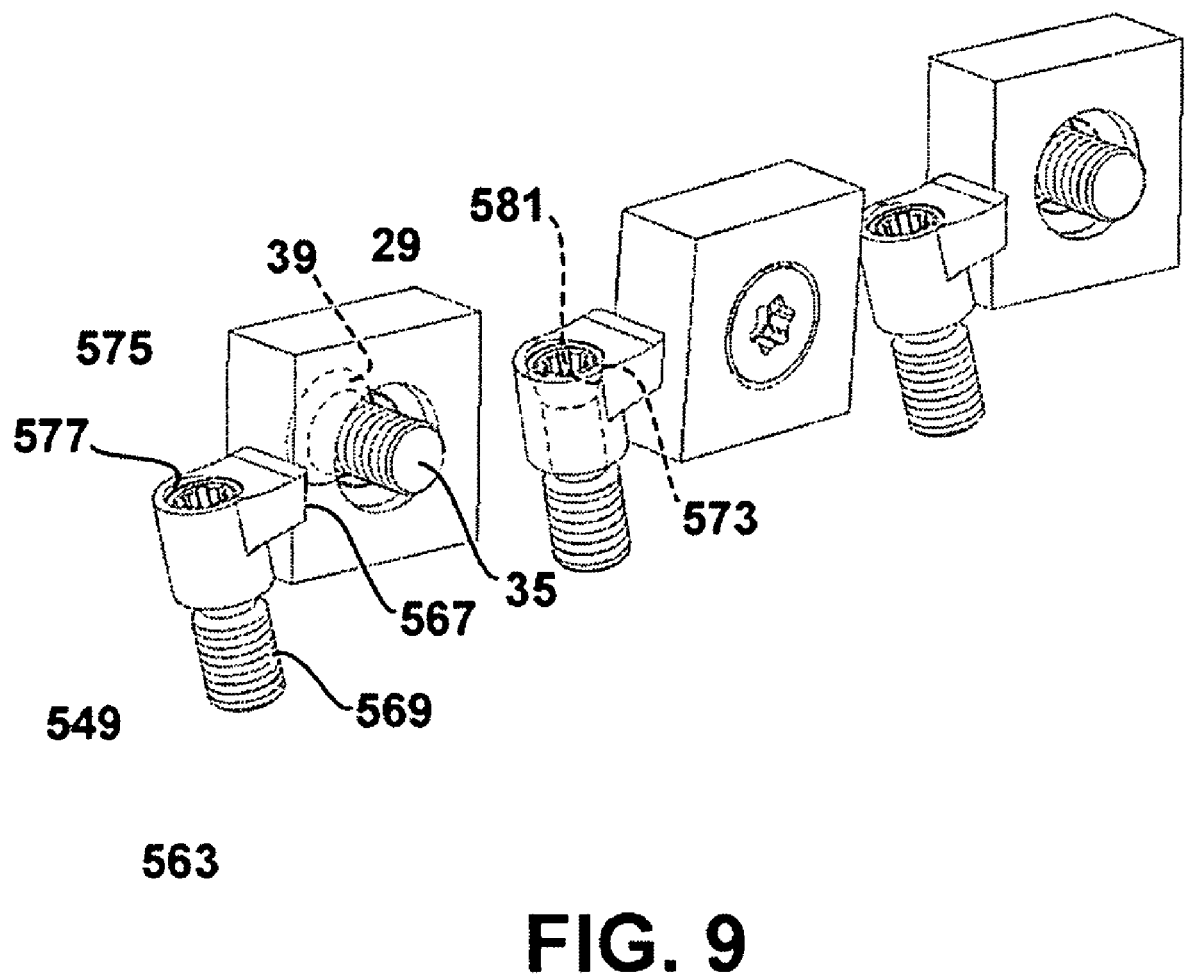
FIG. 9 is a top perspective view of a cutting insert and first and second clamps according to another embodiment of the present invention.

FIGS. 6-9 show a second clamp 549 of a somewhat different type than the clamp 49 illustrated in FIGS. 1-5. The second clamp 549 comprises an insert abutting surface portion 567 (FIG. 8) and an externally threaded portion 569. The insert abutting surface portion 567 is substantially flat and, as seen in FIG. 9, is provided on a member 575 having a through hole 577 through which extends a screw 563 on which the externally threaded portion 569 is provided.

The member 575 can be at least partially disposed in a recess 579 (FIG. 8) in the toolholder. This can facilitate avoiding rotation of the member 575 relative to the cutting insert against which the insert abutting surface portion 567 is to abut. The member 575 and the recess 579 can be non-circular to facilitate preventing rotation of the member relative to the recess.

The screw 563 can be a screw with a frustoconical head 573 (shown in phantom in FIG. 9) and can abut a frustoconical surface 581 (shown in phantom in FIG. 9) in the hole 577. Alternatively, the screw 563 can be a compound screw of the type described in U.S. Pat. No. 4,993,889, which is incorporated by reference, with a threaded head section and a threaded tail section, the head section and the tail section of the screw being threaded in opposite directions. Complementary internal threads are provided in the through hole 577 and in the hole 365 in the toolholder. Both the head and the tail sections are provided with a slot (not shown) for receiving an appropriate drive means, such as a screw driver or hex wrench. As the screw is driven downward into the holes 577 and 365, the wedge shape of the member 575 is drawn into the space between the insert and the walls of the recess 579 in the toolholder to thereby force the insert abutting surface portion 567 to exert pressure against the corresponding face of the insert and press the insert against an opposing wall of the insert-receiving recess in the tool holder.

The cutting insert 23 may be the same or different at different locations on a particular toolholder. The cutting insert 23 shown in FIG. 4 comprises an insert body 91 comprising a bottom surface 33, a top surface 31, and a plurality of edge surfaces 53, 55, 57, and 93 between the bottom surface and the top surface. Ordinarily, depending upon how the insert 23 is intended to be used, a cutting edge will be defined by an intersection between one or more of the edge surfaces and the top surface 31, and/or at intersections of edges surfaces.

The insert 23 has a first clamping surface arranged to receive a clamping force in a direction from the top surface 31 to the bottom surface 33. In the embodiment of FIG. 4, the first clamping surface is a frustoconical internal surface 43 (FIG. 3) of the hole 41 against which the frustoconical external surface of the head of the screw 35 abuts.

The insert 23 also has a second clamping surface 95 on an edge surface 57. The second clamping surface 95 is an area (the general location of which is shown by dotted lines) on the edge surface 57 against which the insert abutting surface portion 67 of the screw 63 abuts. The shapes and relative locations of the first and second clamping surfaces are carefully determined and precision in forming the inserts is important to ensure that the cutting edges of the insert 23 lie in predetermined positions relative to the toolholder 25. An oversized or undersized insert or inserts that having dimensionally imprecise clamping surfaces can damage a workpiece.

An abutment area or surface 97 is provided on a second edge 53 and is arranged to receive an opposing force when a second clamping force is applied to the second clamping surface 95, i.e., in the direction D2. The abutment surface 97 shown in the embodiment shown in FIG. 4 will abut an insert supporting surface on surface 51 shown in FIG. 2. The insert 23 may have additional abutment surfaces 99 and 101 on edges 55 and 57 that will abut insert supporting surfaces 59 and 61 of a recess for the insert in the toolholder 25 when the second clamp 49 applies a force in the direction D2 which tends to rotate the insert around the axis of the screw 35. As the insert may be indexable to a plurality of different positions in the recess, it will be appreciated that the locations of the clamping surfaces and abutment surfaces on the edges may be different depending upon the orientation of the insert relative to the toolholder.

In the embodiment shown in, e.g., FIG. 4, the second clamping surface 95 defines a greater moment arm with respect to an axis of the screw 35 than the clamping surface for the insert abutting surface 567 of the clamp 549, which is shown in FIG. 9 positioned to direct a force that substantially intersects the axis of the screw 35. It is presently contemplated that it will ordinarily be desirable to arrange a second clamp so that it applies a force to an insert abutting surface of an insert in a manner so that the force does not substantially intersect the axis of the screw. It is presently anticipated that an arrangement wherein the force from the second clamp has a larger moment arm will be preferable relative to an arrangement wherein the force from the second clamp has a smaller moment arm. With the former arrangement, the positioning of the insert relative to the toolholder will ordinarily be more predictable and the clamping action more effective to hold the insert in place relative to the insert, largely because the second clamp will ordinarily be forcing the insert to move against a fixed surface of a recess in the cutting tool.

It will be appreciated that, in the embodiments described above, forces in the screws extending through the center hole of the insert can result in primarily tensile stress, however, the forces in the screws may also cause shear stress as in known clamping arrangements wherein tightening of the screw clamps the insert against a surface generally perpendicular to the direction of the screw and against a surface generally parallel to the direction of the screw.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A cutting tool, comprising:
a cutting insert;
a toolholder comprising at least one insert supporting surface;
a first clamp adapted to apply a clamping force in a first direction to clamp the insert to the insert supporting surface; and
a second clamp adapted to limit rotation of the insert about an axis extending substantially in the first direction,
wherein the toolholder comprises a second insert supporting surface, the second clamp applying a clamping force to the insert in a second direction to clamp the insert to the second insert supporting surface, the second insert supporting surface being disposed on an opposite side of the insert from the second clamp.

2. The cutting tool as set forth in claim 1, wherein the second clamp comprises a screw that is screwed into an internally threaded hole in the toolholder.

3. The cutting tool as set forth in claim 2, wherein the internally threaded hole extends substantially in the first direction.

4. The cutting tool as set forth in claim 3, wherein the second clamp comprises an insert abutting surface portion and an externally threaded portion.

5. The cutting tool as set forth in claim 4, wherein the insert abutting surface portion is circularly cylindrical.

6. The cutting tool as set forth in claim 2, wherein the internally threaded hole extends in a direction non-parallel with the first direction.

7. The cutting tool as set forth in claim 6, wherein the internally threaded hole extends in a direction substantially perpendicular to the first direction.

8. The cutting tool as set forth in claim 6, wherein the second clamp comprises an insert abutting surface portion and an externally threaded portion.

9. The cutting tool as set forth in claim 8, wherein the insert abutting surface portion is substantially flat.

10. The cutting tool as set forth in claim 8, wherein the screw extends through a hole in a member comprising the insert abutting surface portion.

11. The cutting tool as set forth in claim 10, wherein the member is at least partially disposed in a recess in the toolholder.

12. The cutting tool as set forth in claim 11, wherein the member is non-rotatable relative to the recess.

13. The cutting tool as set forth in claim 10, wherein a head of the screw comprises a generally frustoconical external surface and the hole in the member comprises a generally frustoconical internal surface against which the frustoconical external surface of the screw is adapted to abut when the screw is fully received in the internally threaded hole in the toolholder.

14. The cutting tool as set forth in claim 1, comprising a second insert, the toolholder comprising at least a second insert supporting surface oriented at an angle to the first insert supporting surface, a third clamp adapted to apply a clamping force in a third direction to clamp the second insert to the second insert supporting surface, and a fourth clamp adapted to limit rotation of the second insert about an axis extending substantially in the third direction.

15. The cutting tool as set forth in claim 14, wherein the second insert supporting surface is oriented at substantially a 90° angle to the first insert support surface.

16. The cutting tool as set forth in claim 15, wherein the second clamp and the fourth clamp are adapted to apply forces to the first insert and the second insert, respectively, in substantially a same direction.

17. The cutting tool as set forth in claim 1, wherein a moment arm of a force applied to the insert by the second clamp about the axis is greater than zero.

* * * * *